(12) United States Patent
Li et al.

(10) Patent No.: US 11,869,247 B2
(45) Date of Patent: Jan. 9, 2024

(54) PERCEPTION DATA DETECTION METHOD AND APPARATUS

(71) Applicant: Apollo Intelligent Connectivity (Beijing) Technology Co., Ltd., Beijing (CN)

(72) Inventors: Dan Li, Beijing (CN); Jianping Li, Beijing (CN); Qian Chen, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 140 days.

(21) Appl. No.: 17/471,022

(22) Filed: Sep. 9, 2021

(65) Prior Publication Data

US 2021/0406564 A1 Dec. 30, 2021

(30) Foreign Application Priority Data

Dec. 24, 2020 (CN) .......................... 202011552344.5

(51) Int. Cl.
*G06V 20/58* (2022.01)
*G06F 18/22* (2023.01)
*G06F 18/2113* (2023.01)

(52) U.S. Cl.
CPC .......... *G06V 20/58* (2022.01); *G06F 18/2113* (2023.01); *G06F 18/22* (2023.01); *G06V 2201/07* (2022.01)

(58) Field of Classification Search
None
See application file for complete search history.

(56) References Cited

U.S. PATENT DOCUMENTS 9,934,689 B2   4/2018 Prokhorov
11,321,911 B2 *  5/2022 Pankey .................... G06T 3/40
(Continued)

FOREIGN PATENT DOCUMENTS

CN   106707293 A   5/2017
CN   108629231 A   10/2018
(Continued)

OTHER PUBLICATIONS

Extended European Search Report of EP21195467.2.
(Continued)

*Primary Examiner* — Santiago Garcia
(74) *Attorney, Agent, or Firm* — J.C. PATENTS

(57) ABSTRACT

The present disclosure discloses a perception data detection method and apparatus. The specific implementation scheme is: acquiring labeled data and perception data, where the labeled data includes a labeled position and a labeled type of at least one first obstacle, and the perception data includes a perception position and a perception type of at least one second obstacle; performing, according to a negative sample in the labeled data, rough filtering on the second obstacle in the perception data to obtain a third obstacle remaining after the rough filtering, where the negative sample is a non-physical obstacle; determining a matching relationship between the third obstacle and the negative sample, and determining the negative sample having the matching relationship with the third obstacle as a target obstacle; and determining, according to the number of the target obstacle and the number of the first obstacle, a detection result of the perception data.

13 Claims, 12 Drawing Sheets

(56) References Cited

U.S. PATENT DOCUMENTS

| | | | |
|---|---|---|---|
| 2012/0002052 A1* | 1/2012 | Muramatsu | G06V 20/58 348/148 |
| 2014/0266803 A1* | 9/2014 | Bulan | G06V 10/255 340/932.2 |
| 2016/0167226 A1* | 6/2016 | Schnittman | G06V 20/10 901/1 |
| 2019/0080203 A1* | 3/2019 | Zhang | G06V 10/764 |
| 2020/0104612 A1 | 4/2020 | Chen | |
| 2020/0257922 A1* | 8/2020 | Huang | G06V 30/224 |
| 2020/0380274 A1* | 12/2020 | Shin | G06V 20/58 |
| 2021/0012165 A1* | 1/2021 | Jiang | G06F 18/214 |
| 2021/0133466 A1* | 5/2021 | Gier | G05D 1/0223 |
| 2021/0398294 A1* | 12/2021 | Cui | G06T 7/174 |
| 2022/0063604 A1* | 3/2022 | Okano | B60W 40/02 |
| 2022/0083787 A1* | 3/2022 | Jia | G06T 7/74 |
| 2022/0227385 A1* | 7/2022 | Miyamoto | B60W 50/16 |
| 2022/0332348 A1* | 10/2022 | Liu | G06V 20/56 |
| 2022/0371602 A1* | 11/2022 | Pan | G01S 7/4808 |

FOREIGN PATENT DOCUMENTS

| | | |
|---|---|---|
| CN | 110069408 A | 7/2019 |
| CN | 110287832 A | 9/2019 |
| CN | 111291697 A | 6/2020 |
| CN | 111753765 A | 10/2020 |
| JP | 2015232805 A | 12/2015 |
| JP | 2016173615 A | 9/2016 |
| JP | 2018013886 A | 1/2018 |
| JP | 2018036241 A | 3/2018 |
| JP | 2019175282 A | 10/2019 |
| JP | 2020091543 A | 6/2020 |
| KR | 10-2019-0103503 | 9/2019 |
| WO | WO2015146113 A1 | 10/2015 |

OTHER PUBLICATIONS

NPL1: "Towards a Real Time Obstacle Detection System for Unmanned Surface Vehicles", Oceans 2019 MTS/IEEE Seattle, Marine Technology Society, pp. 1-8, XP033691202.

NPL2: "Obstacle Detection for Image-Guided Surface Water Navigation", 2016 13th Conference on Computer and Robot Vision (CRV), pp. 45-52, XP033032995.

NPL3: "Obstacles and Foliage Discrimination Using Lidar", Proceeding of SPIE, ISSN 0277-786X vol. 10524, SPIE US, vol. 9837, May 13, 2016, pp. 98370E-98370E, XP060070300.

NPL4: "Energy Minimization Approach for Negative Obstacle Region Detection", IEEE Transaction on Vehicular Technology, IEEE, USA, vol. 68, No. 12 pp. 11668-11678, XP011762211.

NPL5: "PVS: A system for large scale outdoor perception performance evaluation", Robotics and Automation (ICRA), 2011 IEEE International Conference on May 9, 2011, pp. 834-841, XP032034239.

First Office Action of the parallel application JP 2021-188704.

NPL1: "Automatic detection of road signs to support the creation of high-freshness navigation", DOI : https://doi.org/10.11371/iieej.36.456, Journal of the Institute of Image Electronics Engineers of Japan, Japan, Institute of Image Electronics Engineers of Japan, Jul. 25, 2007, vol. 36, No. 4, pp. 456-464.

First Office Action of the priority application CN202011552344.5.

First Office Action of the parallel application KR10-2021-0123843.

* cited by examiner

PERCEPTION DATA DETECTION METHOD AND APPARATUS

CROSS-REFERENCE TO RELATED APPLICATION

This application claims priority to Chinese application No. 202011552344.5, filed on Dec. 24, 2020, which is incorporated by reference in its entirety.

TECHNICAL FIELD

The present disclosure relates to the field of autonomous driving and vehicle-road collaboration in the field of intelligent transportation and, in particular, to a perception data detection method and apparatus.

BACKGROUND

A perception system of an autonomous vehicle can output perception data of an obstacle to a downstream module, and the autonomous vehicle relies heavily on the perception data during a driving process, thus, it is particularly important to detect the output of the perception system.

At present, a perception system of an autonomous vehicle is mainly detected by performing matching based on manually labeled positive sample data and perception data of the perception system to determine the number of obstacles that exist in both the manually labeled positive sample data and a perception result, and then obtain, based on the number of these obstacles and the number of obstacles in the perception result, indicators of the perception system such as a recall rate and a recognition accuracy rate of the obstacles.

However, the abovementioned implementation achieves detection by performing matching based on the positive sample data, which cannot reflect the recognition of a negative sample, thereby resulting in lack of comprehensiveness in detection.

SUMMARY

The present disclosure provides a perception data detection method and apparatus, a device and a storage medium.

According to a first aspect of the present disclosure, a perception data detection method is provided, including:

acquiring labeled data and perception data, where the labeled data includes a labeled position and a labeled type of at least one first obstacle, and the perception data includes a perception position and a perception type of at least one second obstacle;

performing, according to a negative sample in the labeled data, rough filtering on the second obstacle in the perception data to obtain a third obstacle remaining after the rough filtering, where the negative sample is a non-physical obstacle;

determining a matching relationship between the third obstacle and the negative sample, and determining the negative sample having the matching relationship as a target obstacle; and determining a detection result of the perception data, according to a number of the target obstacle and a number of the first obstacle.

According to a second aspect of the present disclosure, an electronic device is provided, including:

at least one processor; and a memory communicatively connected with the at least one processor;

where the memory stores instructions executable by the at least one processor, and the instructions are executed by the at least one processor to cause the at least one processor to perform the method described in the first aspect above.

According to a third aspect of the present disclosure, a non-transitory computer readable storage medium storing computer instructions is provided, where the computer instructions are used to cause a computer to perform the method described in the first aspect above.

It should be understood that the content described in this section is not intended to identify the key or important features of the embodiments of the present disclosure, nor is it intended to limit the scope of the present disclosure. Other features of the present disclosure will be easily understood through the following description.

BRIEF DESCRIPTION OF THE DRAWINGS

The drawings are used to better understand the solution and do not constitute a limitation to the present disclosure.

DESCRIPTION OF EMBODIMENTS

Figure 1:
FIG. 1 is a schematic diagram of a scenario in which an autonomous vehicle follows a sprinkling truck according to an embodiment of the present disclosure.

Exemplary embodiments of the present disclosure will be illustrated below in conjunction with the accompanying drawings, which include various details of the embodiments of the present disclosure to facilitate understanding, and should be considered merely exemplary. Therefore, those skilled in the art should realize that various changes and modifications can be made to the embodiments described herein without departing from the scope and spirit of the present disclosure. Likewise, for clarity and conciseness, descriptions of well-known functions and structures are omitted in the following description.

In order to better understand the technical solutions of the present disclosure, first, background technology involved in the present disclosure will be further introduced in detail.

A perception system of an autonomous vehicle is equivalent to eyes of the autonomous vehicle, and the perception system can output an obstacle such as a person, a vehicle, a bicycle, etc. on the road to a downstream module through a recognition algorithm, based on data such as a point cloud image collected by a sensor.

Since the perception system of the autonomous vehicle plays a very important role, it is particularly important to evaluate an output result of the perception system.

At present, the evaluation of the perception system of the autonomous vehicle usually relies on labeling a truth value, which relies on manual labeling. A process of manual labeling is to record information of an obstacle such as a position and an attribute as the truth value by comparing a point cloud and an image. Then the labeled data is compared with the output result of the perception system to finally obtain indicators of the perception system such as a recall rate and a recognition accuracy rate of the obstacles. In manual labeling, both a positive sample and a negative sample will be labeled at the same time. The positive sample and the negative sample will be explained separately below.

The positive sample refers to an impenetrable obstacle, which needs to be reported to the downstream module by the perception system and may be understood as a physical obstacle, such as a person, a car, a bicycle or a cone bucket.

Since the positive sample is usually a common obstacle on the road, corresponding standards can be found for its size and specification, it is relatively easy for the recognition of the perception system and the labelling of the data. In the evaluation, it can also give a definite evaluation result for the detection of these obstacles according to existing rules.

The negative sample refers to a penetrable obstacle, which does not need to be reported to the downstream module by the perception system and may be understood as a nonphysical obstacle, such as exhaust gas, water mist, fallen leaves, snow or catkin.

For negative samples, these obstacles have no regular shape and fixed size in the real world. Therefore, the perception system of the autonomous vehicle sometimes additionally reports these obstacles as one or more obstacles when detecting. Sometimes it will be detected as a relatively large obstacle due to adhesion with an other obstacle.

In the following, taking a scenario in which an autonomous vehicle follows a sprinkling truck as an example, various possible implementations of obstacle detection will be introduced, for example, it may be understood in conjunction with FIG. 1 to FIG. 5.

Figure 2:
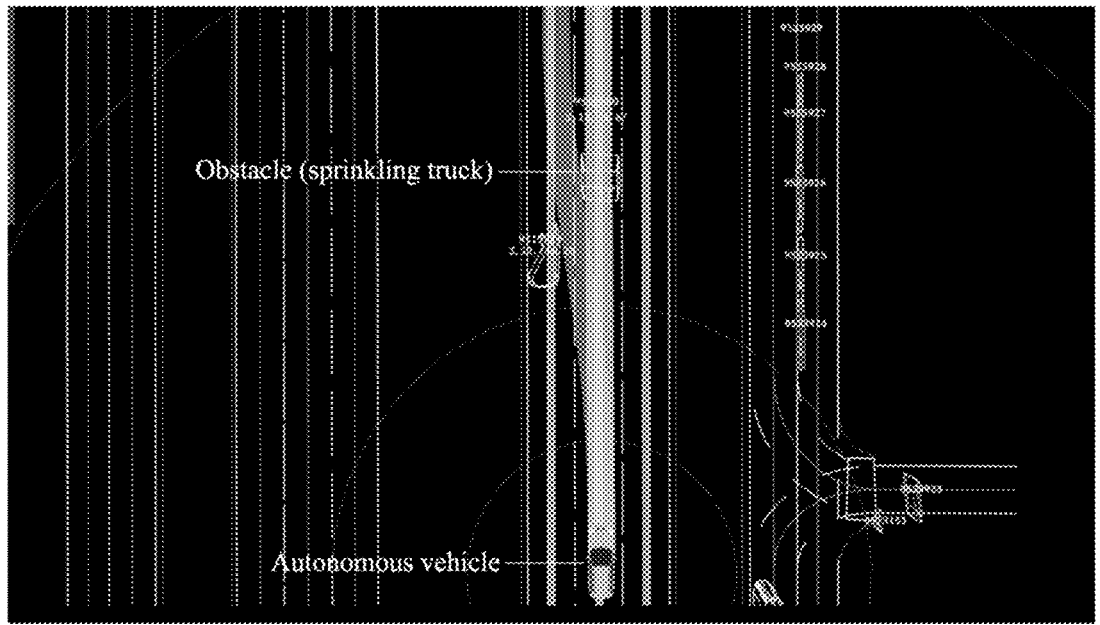
FIG. 2 is a schematic diagram of an ideal situation of obstacle detection according to an embodiment of the present disclosure.
Figure 3:
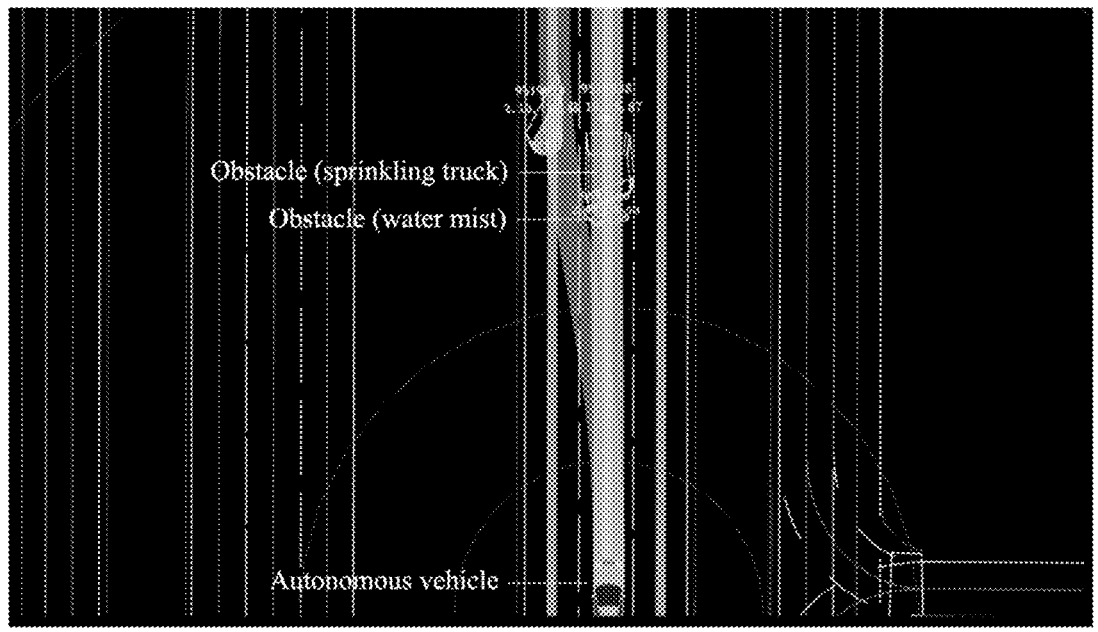
FIG. 3 is a schematic diagram 1 of an error situation of obstacle detection according to an embodiment of the present disclosure.
Figure 4:
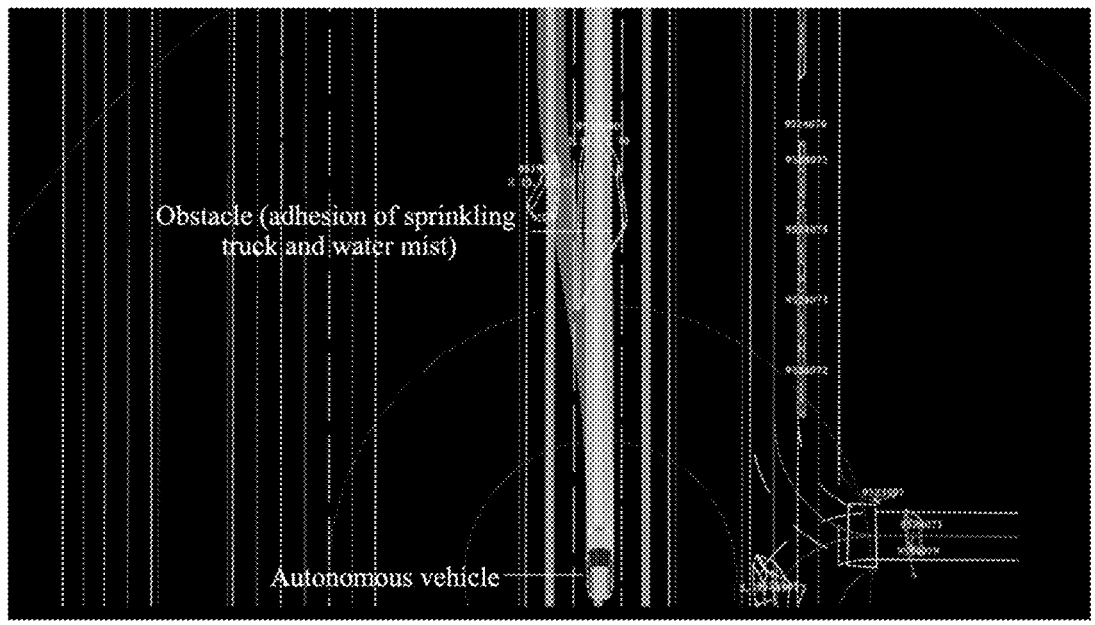
FIG. 4 is a schematic diagram 2 of an error situation of obstacle detection according to an embodiment of the present disclosure.
Figure 5:
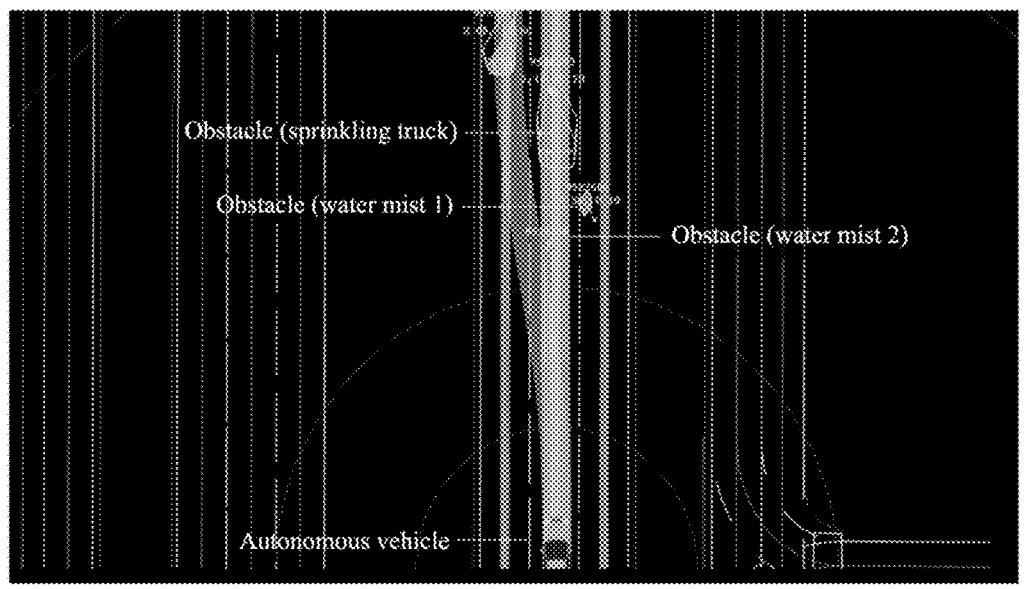
FIG. 5 is a schematic diagram 3 of an error situation of obstacle detection according to an embodiment of the present disclosure.

FIG. 1 is a schematic diagram of a scenario in which an autonomous vehicle follows a sprinkling truck according to an embodiment of the present disclosure, FIG. 2 is a schematic diagram of an ideal situation of obstacle detection according to an embodiment of the present disclosure, FIG. 3 is a schematic diagram 1 of an error situation of obstacle detection according to an embodiment of the present disclosure, FIG. 4 is a schematic diagram 2 of an error situation of obstacle detection according to an embodiment of the present disclosure, and FIG. 5 is a schematic diagram 3 of an error situation of obstacle detection according to an embodiment of the present disclosure.

As shown in FIG. 1, assuming that the current autonomous vehicle is driving on the road, the autonomous vehicle can capture a scene in a forward view, for example, the scene shown in FIG. 1. There is a sprinkling truck in front of the current autonomous vehicle's field of view, and the sprinkling truck is sprinkling water, so there is some water mist at the rear of the truck. The perception system of the autonomous vehicle can perform obstacle detection based on the image.

In a possible implementation, ideally, the obstacle detected by the perception system should only include the sprinkling truck, and the water sprinkled by the sprinkling truck will not be recognized as an obstacle. As shown in FIG. 2, it shows the position of the autonomous vehicle and the information of the perceived obstacle. It can be determined by referring to FIG. 2 that the current situation is ideal and the obstacle detected by the perception system is only the sprinkling truck.

Where the straight line in the background is the position of the lane line, the cube represents the obstacle output by the perception system, and the number represents the identification of the obstacle output by the perception system, for example, "9522680" in FIG. 2 is the identification of the sprinkling truck; and the figure further shows the coordinate of the obstacle, for example, (2, 14, 5.67) in FIG. 2 is the coordinate of the sprinkling truck.

In another possible implementation, the perception system may recognize the water mist as a separate obstacle. As shown in FIG. 3, obstacles recognized by the current perception system include the sprinkling truck and the water mist, where the identification of the sprinkling truck is "9518538" shown in FIG. 3, with the coordinate of (2.19, 5.67), and the identification of the water mist is "9522680" shown in FIG. 3, with the coordinate of (2.48, 5.50).

In another possible implementation, the perception system may adhere the water mist to the sprinkling truck and misrecognize them as a super large obstacle. As shown in FIG. 4, obstacles recognized by the current perception system include an obstacle formed by the adhesion of the sprinkling truck and the water mist, where the identification of the obstacle is "9522680" shown in FIG. 4, with the coordinate of (2.11, 5.70).

In another possible implementation, the perception system may misrecognize the water mist as multiple obstacles. As shown in FIG. 5, obstacles recognized by the current perception system include the sprinkling truck, water mist 1 and water mist 2, where the identification of the sprinkling truck is "9523833" shown in FIG. 5, with the coordinate of (2.18, 5.70), the identification of the water mist 1 is "9522680" shown in FIG. 5, with the coordinate of (−0.58, 0.01), and the identification of the water mist 2 is "9518538" shown in FIG. 5.

Based on the above introduction, it can be determined that false detections of negative samples may appear in the perception system. No matter which situation, it is not conducive to the driving of the autonomous vehicle, thus it is of great significance to identify the output of negative samples of the perception system. And, the shape of the negative sample is irregular, which is very different from the positive sample of the traditional evaluation; therefore, the implementation of detecting the perception system in the traditional solution is not suitable for the negative sample.

In order to better understand the technical solutions of the present disclosure, the implementation of detecting the output of the perception system in the prior art is introduced as follows.

From a macro perspective, both a negative sample and a positive sample are essentially obstacles. At present, the core criteria for the evaluation of an obstacle is:

when an obstacle exists in both the perception result and the labeling result, it is considered that the perception is correct, which is recorded as TP;

when an obstacle appears in the labeled data, but does not appear in the perception result, it is considered that the perception system has missed detection, which is recorded as FN; and when an obstacle appears in the perception output, but does not appear in the labeled data, it is considered that the perception system has a misdetection, which is recorded as FP.

It can be seen from the above criteria that how to determine that the obstacle in the labeled data and the obstacle in the perception output are the same obstacle is the core of the entire evaluation system. In other words, it is necessary to match obstacles in the labeled data and the perception data. The matching method for the positive sample will be introduced below in conjunction with FIG. 6, which is a schematic diagram of a point cloud map of a vehicle according to an embodiment of the present disclosure.

Figure 6:
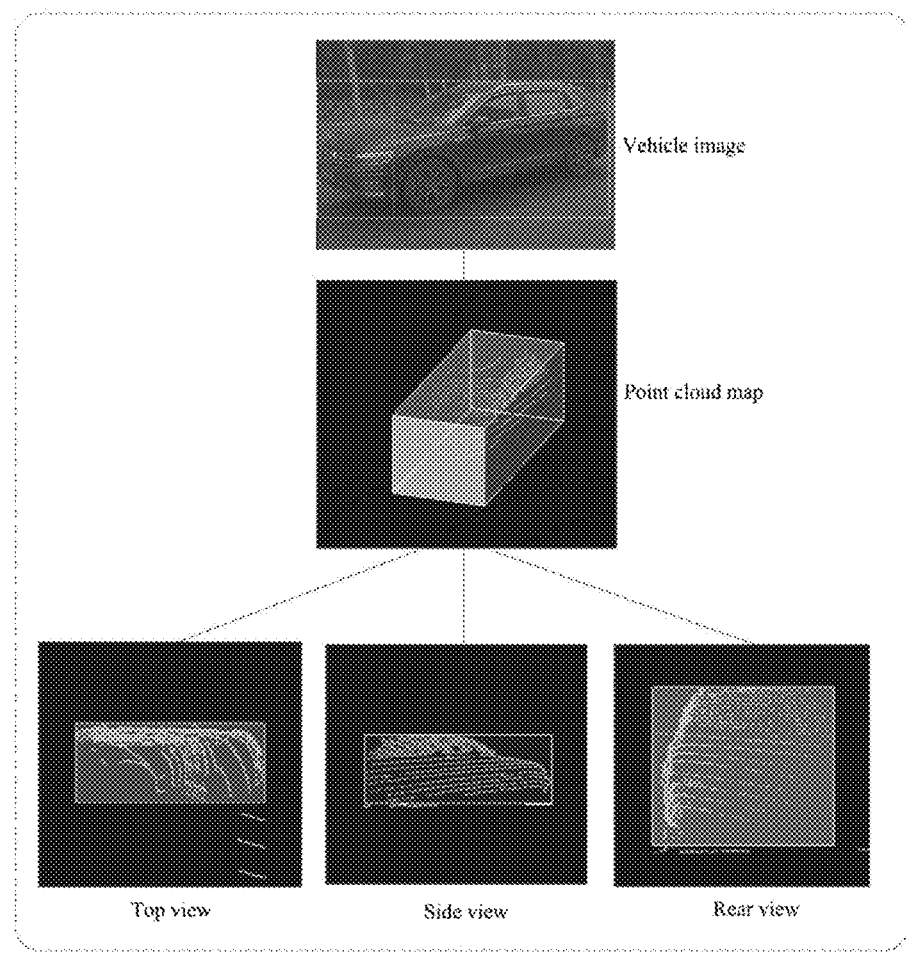
FIG. 6 is a schematic diagram of a point cloud map of a vehicle according to an embodiment of the present disclosure.

As shown in FIG. 6, currently, a point cloud map can be obtained by processing according to a vehicle image. Further, a top view, a side view and a rear view can be obtained based on the point cloud map.

Based on FIG. 6, at present, the commonly used matching method for the positive sample mainly includes the following.

I. Matching Based on the Number of Point Clouds

For example, the point cloud map in FIG. 6 can be referred to for understanding. The point cloud contained in the 3d box of the perception output (prediction truth, PT) is compared with the point cloud contained in the 3d box of the labeled data (ground truth, GT), the number of points that exist both in the 3d box of PT and the 3d box of GT is counted, and the total numbers of points contained in the 3d box of PT and the 3d box of GT are compared.

For example, the total number of point clouds in the manual labeling result GT of obstacle i is a, and the number of point clouds in a detected obstacle PT is b, then an Intersection over Union JI may be defined to satisfy the following Formula I:

$$JI = \frac{a \cap b}{a \cup b} \quad \text{Formula I}$$

In a possible implementation, if the JI of an obstacle is greater than 0.5, it can be considered that this obstacle is matched successfully.

II. Matching Based on an Intersection Over Union of the Ground Projection Frame

For example, the top view in FIG. 6 can be referred to for understanding. The 3d box of the obstacle is projected onto the ground plane to get a rectangle, and the Intersection over Union JI of the areas of GT and PT rectangular boxes is calculated. In a possible implementation, if JI>0.5, it is considered that the match is successful.

III. Matching Based on an Intersection Over Union of the 3d Box of the Obstacle

For example, the point cloud map in FIG. 6 can be referred to for understanding. The Intersection over Union JI of the volumes of the 3d boxes of GT and PT is calculated. In a possible implementation, if JI>0.5, it is considered that the match is successful.

IV. Matching Based on an Intersection Over Union of 2d Projection Frame

For example, the point cloud map in FIG. 6 can be referred to for understanding. The Intersection over Union JI of the projection frames of GT and PT on a 2d image is based. In a possible implementation, if JI>0.5, it is considered that the match is successful.

V. Matching Based on 3d Position

The difference $\Delta P$ between the coordinates $P_{gt}$ ($x_{gt}$, $y_{gt}$, $z_{gt}$) and $P_{pt}$ ($x_{pt}$, $y_{pt}$, $z_{pt}$) of GT and PT obstacles may be calculated. When $\Delta P$ is less than a certain threshold, it is considered that the matching is successful.

VI. Matching by Combining the Above Methods with Each Other

The matching result of an obstacle can be obtained by the several methods introduced above, and the TP, FN and FP introduced above can be determined according to the matching result.

Generally, when evaluating positive samples, the recognition precision of an obstacle can be obtained based on TP, FN and FP, and judgment can be made according to the recognition precision of the obstacle. The higher the precision, the smaller the number of the negative sample recognized, and the better the perception effect. Where for example, the precision may be defined as the following Formula II:

$$\text{precision} = \frac{TP}{TP + FP} \quad \text{Formula II}$$

At present, the evaluation indicator "precision" for the negative sample is essentially still evaluating the positive sample, the disadvantage of the indicator is:

when the TP is large enough, the number of FP has little influence on the indicator, and the indicator change is not sensitive and cannot directly reflect the recognition of the negative sample;

the FP in the calculation formula contains not only the obstacle related to the negative sample, but also a large number of other virtual obstacles, for example, an obstacle is detected to be divided, or a new virtual obstacle is generated due to the defect of an algorithm;

the information of the negative sample in the labeled data is not used in the calculation formula, and the information of the labeled negative sample is not involved in the matching and the calculation of the formula.

In summary, at present, the detection to the output of the perception system is based on the positive sample, and there is no effective detection method to the negative sample, thus it cannot reflect the recognition of the negative sample, thereby resulting in lack of comprehensiveness in the detection.

In response to the problems in the prior art, the present disclosure proposes the following technical idea: providing an evaluation method which is specific to the negative sample, which can evaluate the perception effect of the perception system on the negative sample in the labeled data, and then provide a reference opinion for the iteration of a perception algorithm, which is beneficial for positive iteration of the perception system of the autonomous vehicle.

Figure 7:
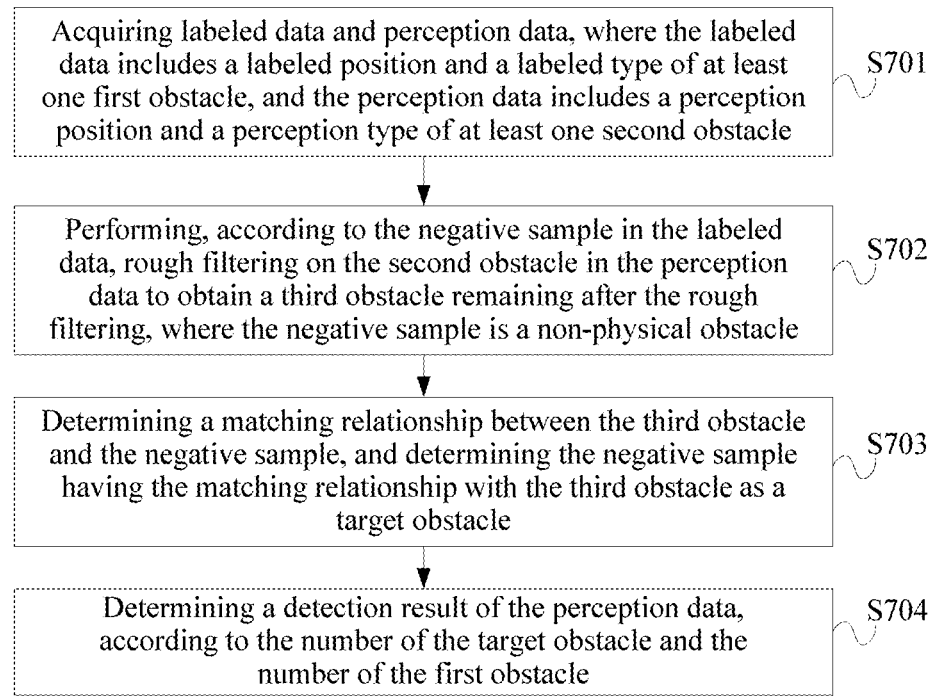
FIG. 7 is a flowchart of a perception data detection method according to an embodiment of the present disclosure.

A perception data detection method provided by the present disclosure will be introduced below in conjunction with specific embodiments. FIG. 7 is a flowchart of a perception data detection method according to an embodiment of the present disclosure.

As shown in FIG. 7, the method includes:

S701: acquiring labeled data and perception data, where the labeled data includes a labeled position and a labeled type of at least one first obstacle, and the perception data includes a perception position and a perception type of at least one second obstacle.

In the embodiment, the labeled data may be manually labeled data. For example, the information of an obstacle such as the position and attribute may be recorded as the true value by comparing point cloud and image. Therefore, it can be understood that the labeled position of the obstacle and the labeled type of the obstacle in the labeled data are true and reliable.

In addition, the obstacle data included in the perception data may be output by the perception system. In this embodiment, it is precisely to detect the accuracy of the perception data output by the perception system.

Where the labeled data may include at least one first obstacle. The labeled data includes a labeled position and a labeled type of the at least one first obstacle, where the labeled type may include, for example, a positive sample and a negative sample. The classification basis may be, for example, whether the obstacle needs to be reported by the perception system. For example, a non-physical obstacle, such as water mist, dust, catkin or exhaust gas, that does not affect the passage of a main vehicle may be classified as a negative sample, and a physical obstacle, such as a vehicle, a pedestrian or a roadblock, that affect the passage of the main vehicle may be determined as a positive sample.

Where the labeled position and the labeled type included in the labeled data depend on the obstacle information in a specific environment, which is not limited in the embodiment.

And, the perception data includes at least one second obstacle. The perception data includes a perception position and a perception type of the at least one second obstacle, where the perception type may be, for example, a specific obstacle type such as a vehicle, a pedestrian, a roadblocks, water mist or dust. Specific implementation of the perception position and the perception type depends on the output of the perception system, which is not particularly limited in the embodiment.

S702: performing, according to the negative sample in the labeled data, rough filtering on the second obstacle in the perception data to obtain a third obstacle remaining after the rough filtering, where the negative sample is a non-physical obstacle.

Based on the above introduction, it can be determined that the labeled data includes a negative sample, and the negative sample may be, for example, a non-physical obstacle. In the embodiment, since it is necessary to perform targeted detection on the negative sample, preliminary rough filtering may be performed on the second obstacle in the perception data according to the negative sample in the labeled data. The third obstacle remaining after the rough filtering may be considered as a preliminarily determined non-physical obstacle in the perception data.

In a possible implementation, for example, a distance between the negative sample and the second obstacle may be determined. When the distance between the second obstacle and the negative sample is relatively short, it indicates that the second obstacle may be able to match the negative sample, that is to say, it may be a non-physical obstacle, then this kind of the second obstacle is retained, and the remaining second obstacle is removed, so as to obtain the third obstacle remaining after the rough filtering.

Therefore, in the embodiment, the third obstacle may be, for example, an obstacle whose distance from the negative sample is less than or equal to a preset distance.

In another possible implementation, for example, the second obstacle whose distance from the negative sample is relatively long may be removed, so that the remaining obstacle is determined as the third obstacle. The embodiment does not specifically introduce the specific implementation of the rough filtering, as long as it can be ensured that the third obstacle remaining after the rough filtering is an obstacle whose distance from the negative sample is relative short.

S703: determining a matching relationship between the third obstacle and the negative sample, and determining the negative sample having the matching relationship with the third obstacle as a target obstacle.

The distance between the third obstacle remaining after the rough filtering and the negative sample is relatively short, and the matching relationship between the third obstacle and the negative sample may be further determined in the embodiment.

In a possible implementation, if the position and the shape of the third obstacle and the negative sample completely match, it is determined that there is a matching relationship between the third obstacle and the negative sample.

In another possible implementation, if there is partial matching between the positions of the third obstacle and the negative sample, it can be determined that there is a matching relationship between the third obstacle and the negative sample.

Alternatively, when an overlap area between the third obstacle and the negative sample is greater than or equal to a preset area, it may also be determined that there is a matching relationship between the third obstacle and the negative sample.

The embodiment does not specifically limit the specific implementation of determining the matching relationship, for example, in addition to determining the matching relationship according to the overlap of the position, the matching relationship may also be determined according to the type of obstacle, as long as the matching relationship can indicate the corresponding relationship between the labeled data and the perception data.

Where the matching relationship may be understood as, assuming that there is a matching relationship between a certain negative sample in the current labeled data and a certain third obstacle in the perception data, it can be considered that the third obstacle may be the negative sample in the labeled data.

It is understandable that there may be a plurality of third obstacles and a plurality of negative samples at present.

After the matching relationship is established, some negative samples may have the matching relationship with the third obstacle, and some negative samples may not have the matching relationship with the third obstacle. In the embodiment, it is possible to, for example, determine the negative sample having the matching relationship with the third obstacle as a target obstacle.

S704: determining a detection result of the perception data, according to the number of the target obstacle and the number of the first obstacle.

Based on the above process, the target obstacle can be determined from the negative sample of the labeled data, where the target obstacle is an obstacle having the matching relationship with the third obstacle in the perception data. Therefore, the detection result of the perception data can be determined according to the number of the target obstacle and the number of the first obstacle in the labeled data.

In a possible implementation, for example, the ratio of the two may be used as the detection result. The detection result is, for example, a recall rate of the negative sample.

Alternatively, it is also possible to determine the remaining indicators used to indicate the detection result based on the number of the target obstacle and the number of the first obstacle, which is not particularly limited in the embodiment.

In the embodiment, the entire implementation process of determining the detection result of the perception data is achieved based on the negative sample. Therefore, the embodiment can effectively determine the detection result to the negative sample, thereby effectively ensuring the comprehensiveness of the detection.

The perception data detection method provided by the embodiment of the present disclosure includes: acquiring labeled data and perception data, where the labeled data includes a labeled position and a labeled type of at least one first obstacle, and the perception data includes a perception position and a perception type of at least one second obstacle; performing, according to a negative sample in the labeled data, rough filtering on the second obstacle in the perception data to obtain a third obstacle remaining after the rough filtering, where the negative sample is a non-physical obstacle; determining a matching relationship between the third obstacle and the negative sample, and determining the negative sample having the matching relationship with the third obstacle as a target obstacle; and determining, according to the number of the target obstacle and the number of the first obstacle, a detection result of the perception data. Rough filtering is firstly performed, according to the negative sample in the labeled data, on the second obstacle in the perception data, then matching is performed on the third obstacle remaining after the filtering and the negative sample to obtain a target obstacle having the matching relationship with the third obstacle, and then based on the number of the target obstacle and the number of the first obstacle in the labeled data, the detection result of the perception data is determined, so as to realize the detection to the negative sample, thereby effectively ensuring the comprehensiveness of the detection.

Figure 8:
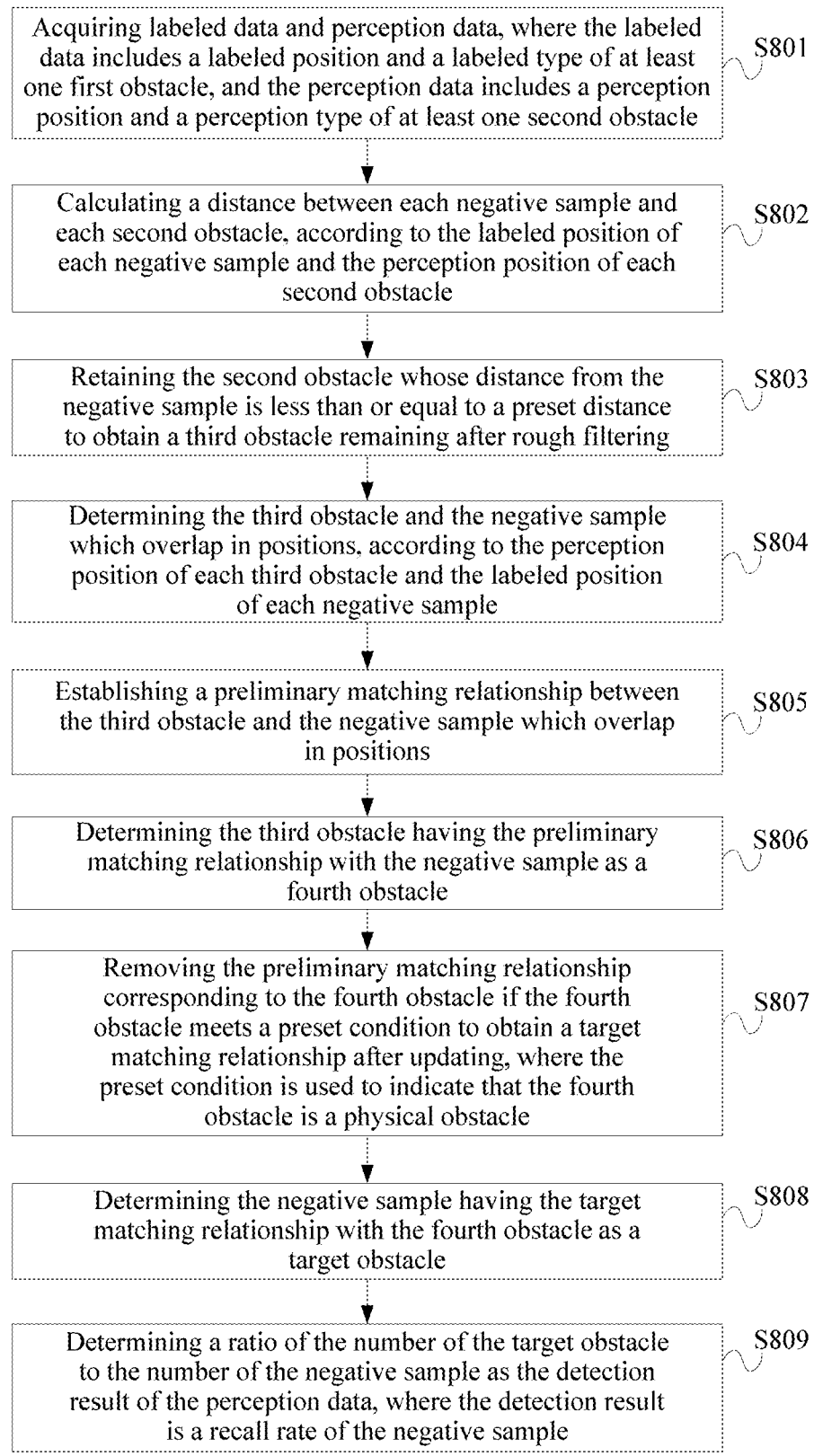
FIG. 8 is a flowchart 2 of a perception data detection method according to an embodiment of the present disclosure.
Figure 9:
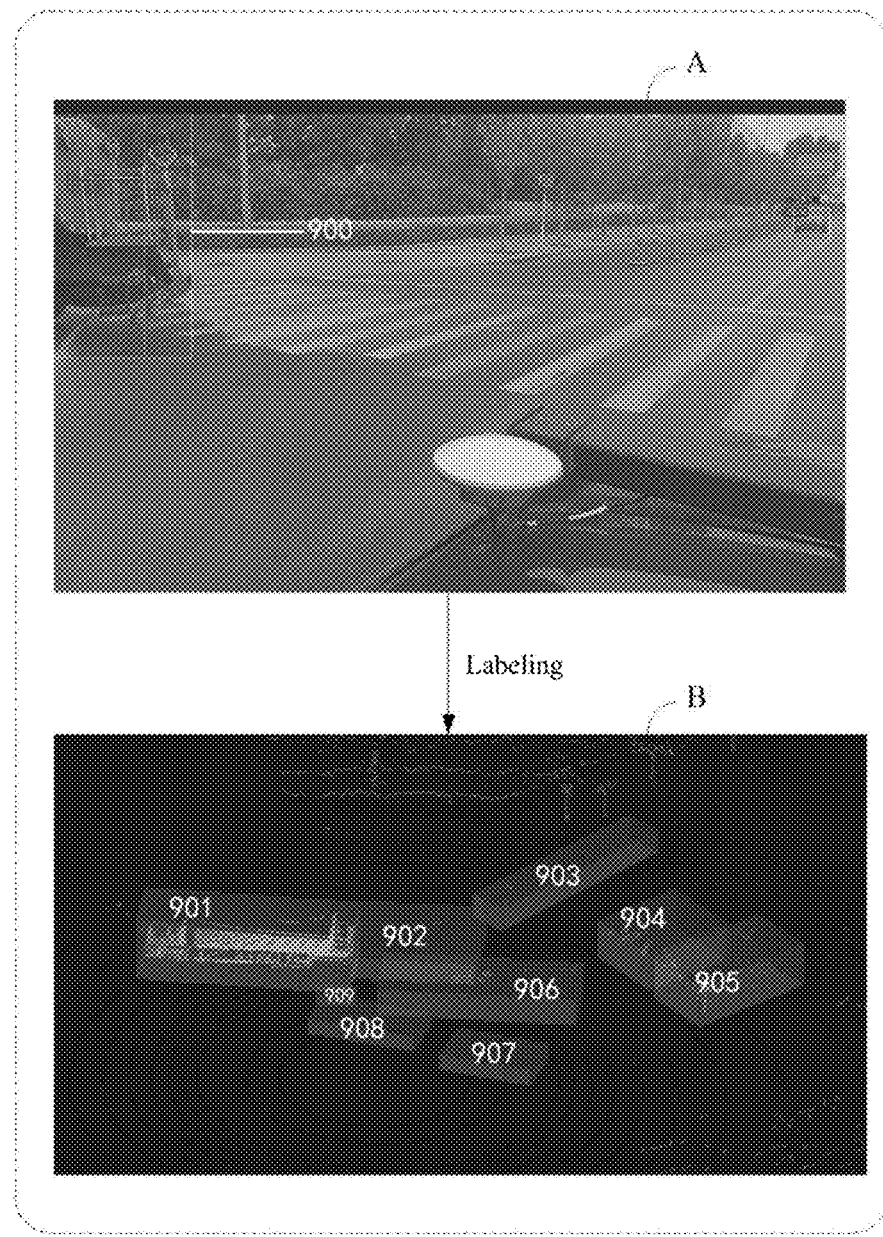
FIG. 9 is a schematic diagram 1 of the implementation of labeled data according to an embodiment of the present disclosure.
Figure 10:
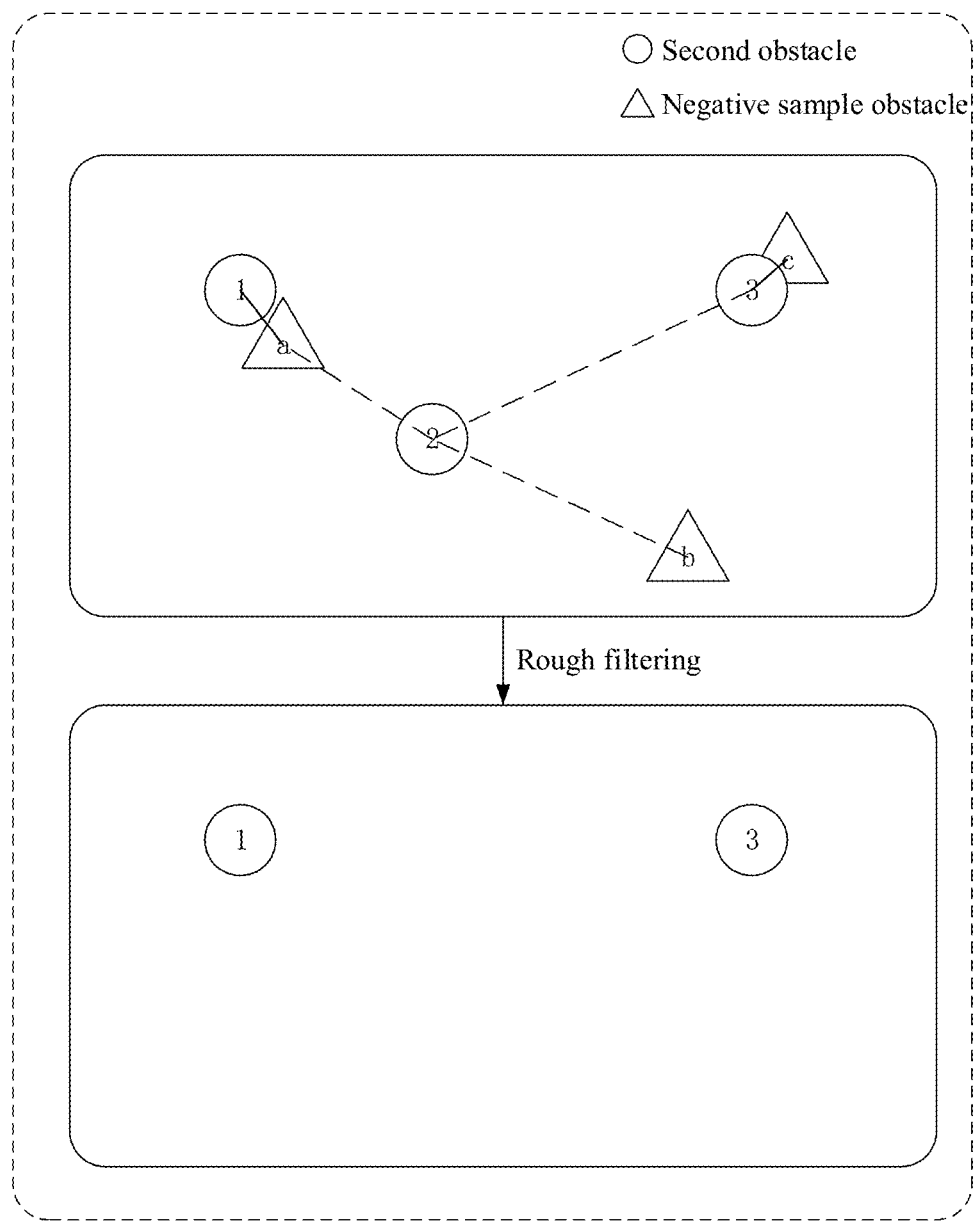
FIG. 10 is a schematic diagram of the implementation of rough filtering according to an embodiment of the present disclosure.
Figure 11:
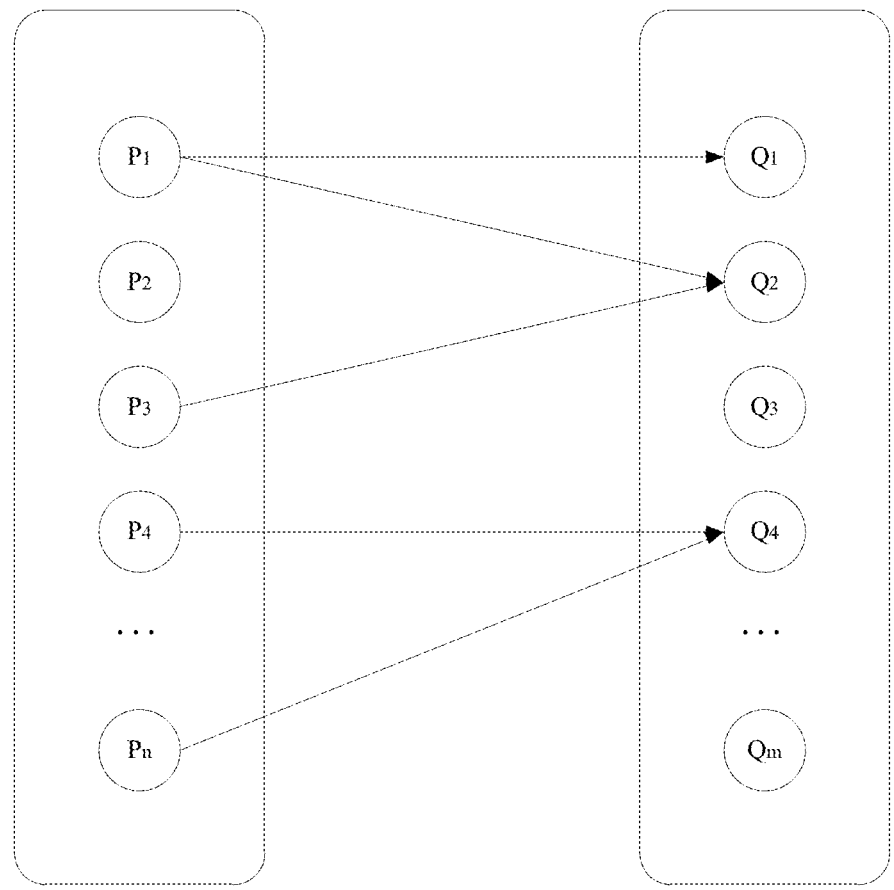
FIG. 11 is a schematic diagram of the implementation of a preliminary matching relationship according to an embodiment of the present disclosure.
Figure 12:
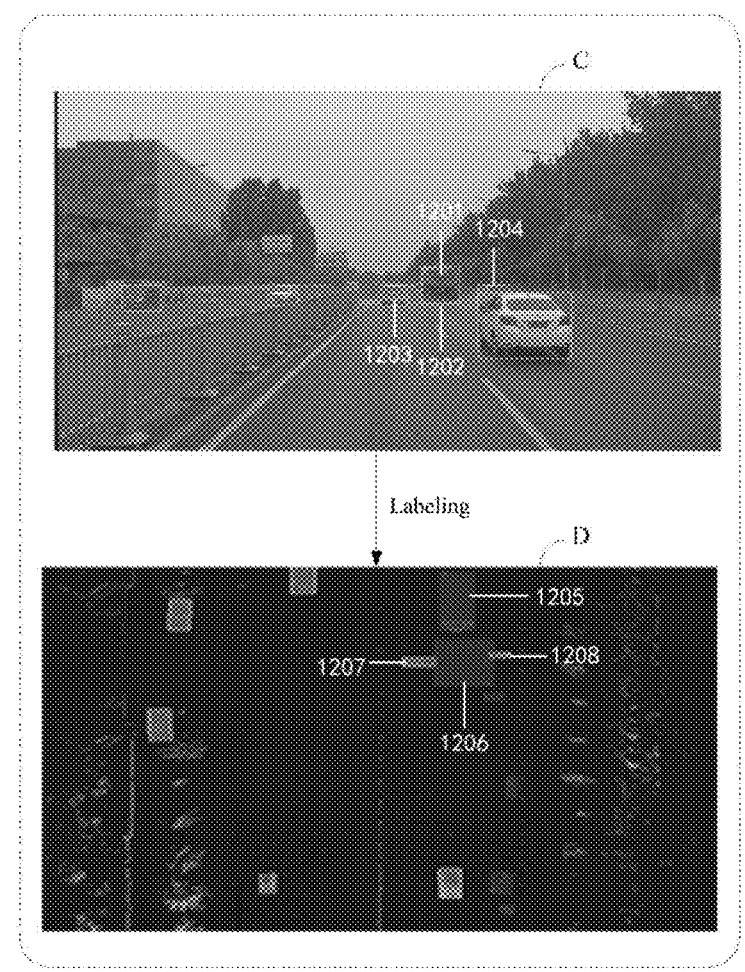
FIG. 12 is a schematic diagram 2 of the implementation of labeled data according to an embodiment of the present disclosure.
Figure 13:
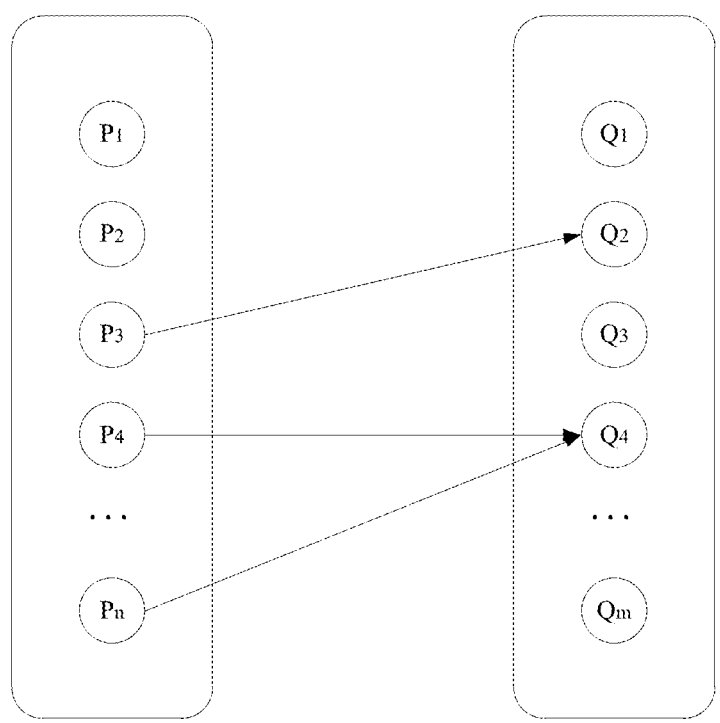
FIG. 13 is a schematic diagram of the implementation of a target matching relationship according to an embodiment of the present disclosure.

On the basis of the above embodiment, the perception data detection method provided by the present disclosure will be further introduced in detail below with reference to FIG. 8 to FIG. 13. FIG. 8 is a flowchart 2 of the perception data detection method according to an embodiment of the present disclosure; FIG. 9 is a schematic diagram 1 of the implementation of labeled data according to an embodiment of the present disclosure; FIG. 10 is a schematic diagram of the implementation of rough filtering according to an embodiment of the present disclosure; FIG. 11 is a schematic diagram of the implementation of a preliminary matching relationship according to an embodiment of the present disclosure; FIG. 12 is a schematic diagram 2 of the implementation of labeled data according to an embodiment of the present disclosure; and FIG. 13 is a schematic diagram of the implementation of a target matching relationship according to an embodiment of the present disclosure.

As shown in FIG. 8, the method includes:

S801: acquiring labeled data and perception data, where the labeled data includes a labeled position and a labeled type of at least one first obstacle, and the perception data includes a perception position and a perception type of at least one second obstacle.

Where the implementation of S801 is similar to that of S701 and will not be repeated herein.

For example, the implementation of the labeled data may be introduced in conjunction with FIG. 9. Assuming that the labeling can currently be made through an image, thereby labeling the position and the type of the obstacle. As shown in FIG. 9, the labeled image in FIG. 9 may include, for example, the image A of the sprinkling truck, and the image A includes the sprinkling truck 900 that is sprinkling water. By labeling based on the image and the point cloud data, the labeled image B of the sprinkling truck that is sprinkling water as shown in FIG. 9 can be obtained. In the current example, for example, 9 first obstacles may be included, where 901 is the labeled result of the body of the sprinkling truck, and the red boxes 902~909 are the labeled results of the water mist.

In a possible implementation, the sprinkling truck 901 is a positive sample, and 902~909 are negative samples.

In an actual implementation process, the specific implementation of the labeled data may be determined according to actual requirements, which is not particularly limited in the embodiment.

S802: calculating a distance between each negative sample and each second obstacle, according to the labeled position of each negative sample and the perception position of each second obstacle.

In the embodiment, a preliminary screening can be performed based on the negative sample in the labeled data and the second obstacle in the perception data. Where the distance between the negative sample and the second obstacle that can be matched successfully must be relatively short, thus the distance between each negative sample and each second obstacle may be calculated firstly based on the labeled position of each negative sample and the perception position of each second obstacle.

In a possible implementation, the abovementioned distance may be, for example, Euclidean distance, and there may be a plurality of negative samples, and there may also be a plurality of second obstacles. The embodiment may calculate the distance between every two negative samples and the second obstacle. For example, currently, there are negative sample A and negative sample B, and second obstacle 1 and second obstacle 2, the embodiment can calculate the distance between A and 1, the distance between A and 2, the distance between B and 1, and the distance between B and 2.

For example, there is currently a negative sample in the labeled data with the coordinate $P_{gt}$ ($x_{gt}$, $y_{gt}$, $z_{gt}$), and there is currently a second obstacle in the perception data with the coordinate $P_{pt}$ ($x_{pt}$, $y_{pt}$, $z_{pt}$), then the Euclidean distance D between $P_{gt}$ and $P_{pt}$ may be calculated by the following Formula III:

$$D = ((x_{pt} - x_{gt})^2 + (y_{pt} - y_{gt})^2 + (z_{pt} - z_{gt})^2)^{1/2} \quad \text{Formula III}$$

In the actual implementation process, in addition to calculating the Euclidean distance, any possible distance can be calculated based on the coordinates, which is not particularly limited in the embodiment.

S803: retaining the second obstacle whose distance from the negative sample is less than or equal to a preset distance to obtain a third obstacle remaining after rough filtering.

In the embodiment, if a distance between a certain second obstacle and a negative sample is less than or equal to a preset distance, it means that the distance between the second obstacle and the negative sample is relatively short, thus the second obstacle may be successfully matched with the negative sample. Alternatively, it may be understood that the second obstacle may also be a non-physical obstacle. Thus the second obstacle whose distance from the negative sample is less than or equal to the preset distance is retained, and the remaining second obstacle is removed, so as to obtain the third obstacle remaining after rough filtering.

Where the specific preset distance may be selected according to actual requirements, which is not particularly limited in the embodiment.

It is worth noting that there may be a plurality of negative samples, and there may also be a plurality of second obstacles. Therefore, for one second obstacle, there may be a distance corresponding to a plurality of the negative samples. As long as a distance between the second obstacle and any negative sample is less than the preset distance, it can be considered that the distance between the second obstacle and the negative sample is relatively short, so that the second obstacle can be determined as the third obstacle that can be retained.

For example, it can be understood in conjunction with FIG. 10. Assuming that there are currently 3 second obstacles, namely 1, 2, and 3, and that there are currently 3 negative samples, namely a, b, and c. In order to clearly see the distance between the second obstacle and the negative sample, the second obstacle and the negative sample are labeled in the same block diagram.

Based on FIG. 10, it can be determined that currently the distance between the second obstacle 1 and the negative sample a is relatively short, and the distance between the second obstacle 3 and the negative sample c is relatively short. Assuming that the distances corresponding to the two second obstacles are both less than the preset distance, it can be determined that both the second obstacle 1 and the second obstacle 3 are obstacles that can be retained.

However, the distance between the second obstacle 2 and the negative sample a, the negative sample b, or the negative sample c is relatively long, that is, the distance from the second obstacle 2 to each corresponding negative sample is greater than the preset distance, thus the second obstacle 2 can be filtered out.

Therefore, after performing filtering on the second obstacles 1, 2 and 3 based on the example in FIG. 10, the obstacle 2 will be filtered out, retaining 1 and 3, thus the third obstacles remaining after rough filtering determined in the current example are 1 and 3 in FIG. 10.

The above description in conjunction with FIG. 10 is an exemplary description, in the actual implementation process, the specific number and actual position of the second obstacle, and the specific number and actual position of the negative sample can be determined according to the actual scenario, which is not particularly limited in the embodiment.

S804: determining the third obstacle and the negative sample which overlap in positions, according to the perception position of each third obstacle and the labeled position of each negative sample.

S805: establishing a preliminary matching relationship between the third obstacle and the negative sample which overlap in positions.

S804 and S805 are introduced together below.

In the embodiment, the third obstacle remaining after rough filtering is an obstacle with an adjacent negative sample, thus in the embodiment, according to the perception position of each third obstacle and the labeled position of each negative sample, the number of the obstacle that needs to be processed can be effectively reduced, thereby determining the matching relationship quickly and efficiently.

In a possible implementation, the matching relationship in the embodiment may not be a strict one-to-many relationship, but may be, for example, a many-to-many relationship. For example, as long as there is an overlap between a third obstacle and a negative sample, it can be considered that there is a matching relationship between the third obstacle and the negative sample.

Here is an example for illustration, currently, the set of the third obstacle remaining after the rough filtering is $P\{P_1, P_2, \ldots, P_n\}$, and the set of the negative sample is $Q\{Q_1, Q_2, \ldots, Q_m\}$.

The matching relationship is determined based on the above two sets. An obstacle $P_1$ is taken from $P\{P_1, P_2, \ldots, P_n\}$, and a matching degree with an obstacle Q in the negative sample set $Q\{Q_1, Q_2, \ldots, Q_m\}$ of the labeled data is calculated. If the projection frames of $P_1$ and $Q_j$ on the ground overlap, it is considered that there is a matching relationship between $P_1$ and $Q_j$, so as to establish a corresponding relationship $\overrightarrow{(P_iQ_j)}$ between $P_i$ and $Q_j$.

After traversal is completed, for example, a many-to-many matching relationship shown in FIG. 11 can be obtained. Referring to FIG. 11, it can be determined that at least the following matching relationships exist:

$$\overrightarrow{(P_1Q_1)}, \overrightarrow{(P_1Q_2)}, \overrightarrow{(P_3Q_2)}, \overrightarrow{(P_4Q_4)}, \overrightarrow{(P_nQ_4)}.$$

It is worth noting that, in the embodiment, the matching relationship established based on the existence of position overlap is not a strict one-to-one matching relationship. Therefore, what is currently established based on position overlap is only a preliminary matching relationship, and further processing will be performed subsequently, so as to obtain a final matching relationship.

S806: determining the third obstacle having the preliminary matching relationship with the negative sample as a fourth obstacle.

When further processing the preliminary matching relationship, it needs to be processed based on the obstacle having the preliminary matching relationship with the negative sample. Thus the embodiment may screen out the third obstacle with the preliminary matching relationship from the overall third obstacles to obtain the fourth obstacle.

For example, based on the above introduction, the set of the third obstacle remaining after the rough filtering is $P\{P_1, P_2, \ldots, P_n\}$, and for example, currently the set of the negative sample is $Q\{Q_1, Q_2, \ldots, Q_m\}$, and the above matching relationship is shown in FIG. 11.

The third obstacle having the preliminary matching relationship with the negative sample may be formed into a new set P'{$P_1, P_3, P_4, \ldots, P_n$}. With respect to the set of P, the set P' at least does not include $P_2$, since it can be determined based on FIG. 11 that there is no preliminary matching relationship for $P_2$. Where what is included in P' is the fourth obstacle mentioned in the embodiment.

In addition, the negative sample having the preliminary matching relationship with the third obstacle may be formed into a new set Q'{$Q_1, Q_2, Q_4, \ldots, Q_m$}. With respect to the set of Q, the set Q' at least does not include $Q_3$, since it can be determined based on FIG. 11 that there is no preliminary matching relationship for $Q_3$.

S807: removing the preliminary matching relationship corresponding to the fourth obstacle if the fourth obstacle meets a preset condition to obtain a target matching relationship after updating, where the preset condition is used to indicate that the fourth obstacle is a physical obstacle.

After determining the fourth obstacle, it may be sequentially determined based on the determined fourth obstacle whether each fourth obstacle meets the preset condition. In the embodiment, the preset condition is used to indicate that the fourth obstacle is a physical obstacle. It is understandable that the detection in the embodiment is based on the negative sample, that is to say, the detection is performed on the non-physical obstacle. Thus for the fourth obstacle (i.e., the physical obstacle) that meets the preset condition, the preliminary matching relationship of this part of the fourth obstacle may be removed, so as to obtain the target matching relationship after updating.

In a possible implementation, the preset condition includes at least one of the following items: a perception category of the fourth obstacle being a category of a physical obstacle, the number of image frames corresponding to the fourth obstacle being greater than a preset number, a difference between a length of the fourth obstacle in a current image frame and an average length of fourth obstacles in the image frames being less than or equal to a first threshold, a difference between a width of the fourth obstacle in a current image frame and an average width of the fourth obstacles in the image frames being less than or equal to a second threshold, or a difference between a height of the fourth obstacle in a current image frame and an average height of the fourth obstacles in the image frames being less than or equal to a third threshold.

In the following, the implementation of determining whether each fourth obstacle meets the preset condition is described in combination with a specific example.

The current preset condition is a condition used to indicate whether it is a physical obstacle, or may be understood as a condition used to determine whether each fourth obstacle has continuity. The reason for this determination is that the negative sample obstacle has a particularity, for example, some water mist obstacle will overlap with an ordinary obstacle.

It can be understood in conjunction with FIG. 12. As shown in FIG. 12, assuming that the labeling is currently performed on the image C, the image C includes: the sprinkling truck 1201 that is sprinkling water, the water mist 1202 sprinkled by the sprinkling truck, the vehicle 1203 on the left of the sprinkling truck, and the vehicle 1204 on the right of the sprinkling truck. After labeling the image C, for example, the labeled image D shown in FIG. 12 can be obtained.

Where the obstacle 1205 corresponds to the sprinkling truck 1201, the obstacle 1206 corresponds to the water mist 1202 sprinkled by the sprinkling truck, the obstacle 1207 corresponds to the vehicle 1203 on the left of the sprinkling truck, and the obstacle 1208 corresponds to the vehicle 1204 on the right of the sprinkling truck.

Based on the labeled image D in FIG. 12, it can be determined that the labeled box 1206 of water sprinkled by the sprinkling truck overlaps with the labeled boxes 1207 and 1208 of the left and right vehicles behind the sprinkling truck. Since the positions overlap, the obstacles corresponding to the two vehicles that are output by the perception will also exist in the set P' at this time.

However, in fact, these two vehicles are not virtual obstacles, what is ultimately needed in the embodiment is a virtual obstacle. Therefore, the main purpose of determining based on the preset condition is to filter out this part of the obstacle, and at the same time remove the corresponding relationship established based on this part of the obstacle.

The implementation of the preset condition will be introduced below in combination with a specific example. Where the basis for determining whether the attribute of an obstacle has continuity is:

the category of the obstacle is detected as a category of a physical obstacle, e.g., a vehicle, a person, a roadblock, etc., where the category of the physical obstacle may be selected and expanded according to actual needs, which is not particularly limited in the embodiment;

the life cycle of the obstacle is greater than 10 frames, that is, the number of the image frames corresponding to the obstacle is greater than a preset number; in the current example, for example, the preset number may be 10; in the actual implementation process, the specific implementation of the preset number may be selected according to actual needs, which is not particularly limited in the embodiment;

the length, width and height attributes of the obstacle throughout its entire life cycle are extracted, average values $\overline{L}, \overline{W}, \overline{H}$ are calculated, and it is determined whether the change rate of the length, width and height (L, W, H) of the obstacle with respect to the average value at this time is greater than a given threshold; if yes, it means that the shape of the obstacle has undergone an abrupt change at this time, indicating that the shape of the obstacle is unstable, and the corresponding relationship should be retained at this time; otherwise, it means that the shape of the obstacle is relatively stable, and it is not a virtual obstacle caused by water mist, dust, etc., and the corresponding relationship should be removed.

That is to say, in the embodiment, it is possible to remove the preliminary matching relationship corresponding to the fourth obstacle that meets the preset condition. An exemplary introduction is currently made.

For example, the current set of the fourth obstacle is P' {$P_1, P_3, P_4, \ldots, P_n$}. In this set, for example, it can be determined that the fourth obstacle that meets the preset condition is $P_1$, then the matching relationship corresponding to $P_1$ is removed. Where the matching relationship corresponding to $P_1$ includes $\overrightarrow{(P_1 Q_1)}, \overrightarrow{(P_1 Q_2)}$, then after removing these two matching relationships, the obtained target matching relationship is as shown in FIG. 13. Referring to FIG. 13, it can be determined that at least the following target matching relationships exist:

$$\overrightarrow{(P_3 Q_2)}, \overrightarrow{(P_4 Q_4)}, \overrightarrow{(P_n Q_4)}.$$

Finally, after removing the stable obstacle, the mapping sets P" {$P_3, P_4, \ldots, P_n$} and Q" {$Q_2, Q_4, \ldots, Q_m$} are obtained.

S808: determining the negative sample having the target matching relationship with the fourth obstacle as a target obstacle.

The target matching relationship determined above is the final matching relationship, and the negative sample having the final target matching relationship with the fourth obstacle is determined as the target obstacle. For example, as described above, based on the determined target matching relationship, the mapping set Q" {$Q_2$, $Q_4$, . . . , $Q_m$} after removing the stable obstacle is determined, then the negative sample in the set Q" is the target obstacle in the embodiment.

S809: determining a ratio of the number of the target obstacle to the number of the negative sample as the detection result of the perception data, where the detection result is a recall rate of the negative sample.

The target obstacle is an obstacle obtained after removing a part of the negative sample, and the negative sample originally corresponds to an initial number. In the embodiment, by calculating the ratio of the number of the target obstacle to the number of the negative sample, the recall of the negative sample of the perception data can be obtained, thereby effectively realizing the detection to the negative sample.

Combining the above examples to illustrate, the total number of elements in the finally obtained set Q" is the number of the target obstacle, and the total number of elements in the original set Q is the number of negative samples. The total number of elements in the set Q" is divided by the total number of elements in the original set Q, the recall rate of the negative sample can be obtained. Where the higher the recall rate of the negative sample, the more the negative sample recalled, and the worse the perception effect, and vice versa, the better the perception effect.

In the actual implementation process, an arbitrary detection result may be determined based on the data obtained above. The specific implementation of the detection result is not particularly limited in the embodiment, as long as the detection of the recognition of the negative sample can be realized.

The perception data detection method provided by the embodiment of the present disclosure first performs a preliminary rough filtering on the second obstacle in the perception data, based on the distance between the second obstacle in the perception data and the negative sample in the labeled data, to obtain the third obstacle that is relatively close to the negative sample, and then performs matching based on the third obstacle, which can effectively reduce the number of obstacle that need to be matched, thereby improving the processing efficiency of the matching. Additionally, a preliminary matching relationship is determined based on position overlap, and then screening is performed according to a preset condition to obtain a final target matching relationship, which avoids the high processing complexity caused by the need of determining a one-to-one exact matching relationship. Therefore, the embodiment can simply, efficiently, and accurately realize the determination of the matching relationship. In addition, the abovementioned preset condition can filter the physical obstacle to finally determine the detection result based on the determined target matching relationship, which can effectively realize the detection to the recognized negative sample, effectively improving the comprehensiveness of the detection of the perception data.

Figure 14:
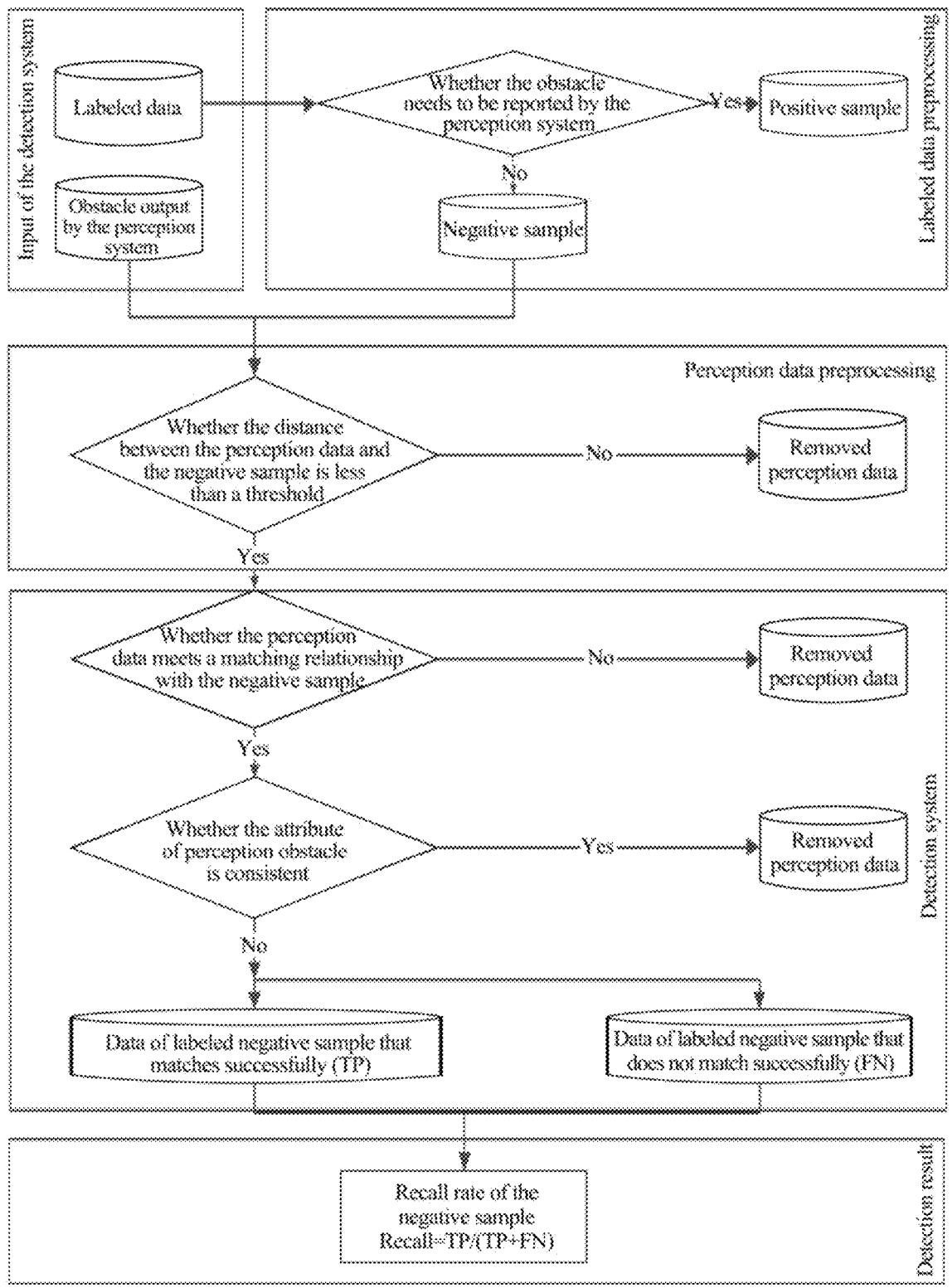
FIG. 14 is a schematic flowchart of a perception data detection method according to an embodiment of the present disclosure.

On the basis of the above embodiments, a systematic introduction of the entire process of the perception data detection method provided by the embodiments of the present disclosure is given below in conjunction with FIG. 14. FIG. 14 is a schematic flowchart of the perception data detection method according to the embodiment of the present disclosure.

As shown in FIG. 14:

first is the input part of the detection system, which can obtain the labeled data and the perception data output by the perception system. For the labeled data, it can be divided into the positive sample and the negative sample based on whether the obstacle needs to be reported by the perception system. Where the positive sample is the obstacle that needs to be reported by the perception system, and the negative sample is the obstacle that does not need to be reported by the perception system.

Then, detection is performed based on the negative sample and the perception data. Firstly, it is determined whether the distance between the perception data and the negative sample is less than a distance threshold. If no, it means that the distance between the obstacle in the perception data and the negative sample is relatively long, and it should be a physical obstacle, thus this part of the perception data can be removed.

A further judgment is performed on the perception data and the negative sample whose distance is less than the distance threshold. Specifically, a matching relationship between this part of the perception data and the negative sample may be determined. The matching relationship in the embodiment may be, for example, if there is overlapped position, it is determined that there exists the matching relationship. The perception data that is determined to have the matching relationship with the negative sample is retained, and the perception data that is determined to have no matching relationship with the negative sample is removed.

Subsequently, based on the perception data that is determined to have the matching relationship, it is determined whether the preset condition is met, for example, whether the attribute of the perception obstacle is consistent. If it is consistent, it indicates that this part of the perception data should be a physical obstacle, and then this part of the perception data is removed, and the matching relationship corresponding to this part of the perception data is also removed.

The perception data without consistency is retained, and based on its corresponding matching relationship, the negative sample that matches successfully is determined to obtain TP. And the negative sample that does not match successfully is determined to obtain FN. Where, the meaning of TP and the meaning of FN are similar to those introduced above.

Next, for example, the recall rate of the negative sample can be obtained according to the following Formula IV:

$$\text{Recall} = \frac{TP}{TP + FN} \qquad \text{Formula IV}$$

Where the Recall is the recall rate of the negative sample. It is understandable that TP+FN is the number of the negative sample, and TP is the number of the target obstacle introduced above.

In summary, as autonomous driving technology is becoming more and more mature today, the perception algorithm and the detection algorithm for positive sample obstacle are becoming more and more perfect. At this time, the perception effect for the negative sample has gradually attracted people's attention. Misreport of the obstacle such as water mist and exhaust gas often causes the main vehicle to brake suddenly, leading to an increase in the probability of the accident such as a rear-end collision, which is not conducive to safe driving. The negative sample obstacle may overlap with the positive sample due to the irregular shape and the particularity of its nature, thus it is impossible to directly apply the detection rule for the positive sample to the detection of the negative sample.

The present disclosure proposes a detection method specifically for the negative sample, which can detect the perception effect of the perception system on the negative sample in the labeled data, and then provide reference opinions for the iteration of the perception algorithm, which is helpful for the positive iteration of perception system of the autonomous vehicle.

Figure 15:
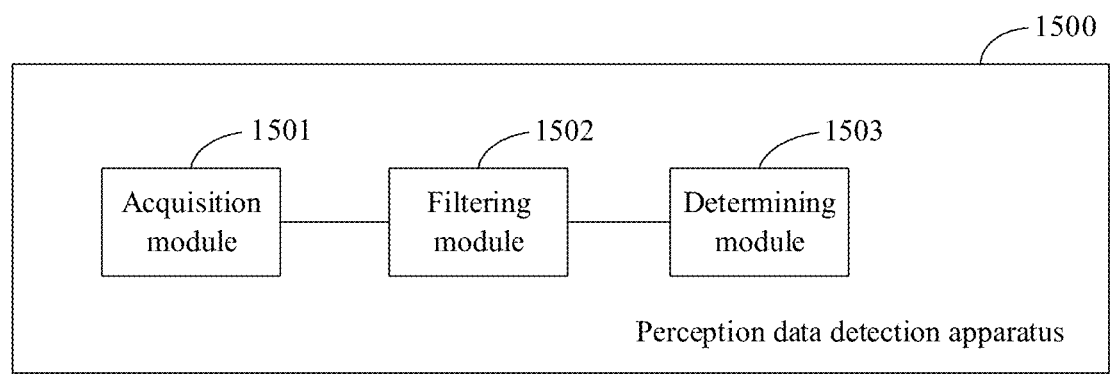
FIG. 15 is a schematic structural diagram of a perception data detection apparatus according to an embodiment of the present disclosure.

FIG. 15 is schematic structural diagram of a perception data detection apparatus according to an embodiment of the present disclosure. As shown in FIG. 15, the perception data detection apparatus 1500 in the embodiment may include: an acquisition module 1501, a filtering module 1502, and a determining module 1503.

The acquisition module 1501 is configured to acquire labeled data and perception data, where the labeled data includes a labeled position and a labeled type of at least one first obstacle, and the perception data includes a perception position and a perception type of at least one second obstacle.

The filtering module 1502 is configured to perform, according to a negative sample in the labeled data, rough filtering on the second obstacle in the perception data to obtain a third obstacle remaining after the rough filtering, where the negative sample is a non-physical obstacle.

The determining module 1503 is configured to determine a matching relationship between the third obstacle and the negative sample, and determine the negative sample having the matching relationship with the third obstacle as a target obstacle.

The determining module 1503 is further configured to determine a detection result of the perception data, according to the number of the target obstacle and the number of the first obstacle.

In a possible implementation, the filtering module 1502 includes:
 a calculation unit, configured to calculate a distance between each negative sample and each second obstacle, according to the labeled position of each negative sample and the perception position of each second obstacle; and
 a filtering unit, configured to retain the second obstacle whose distance from the negative sample is less than or equal to a preset distance to obtain the third obstacle remaining after the rough filtering.

In a possible implementation, the determining module 1503 includes:
 a determining unit, configured to determine the third obstacle and the negative sample which overlap in positions, according to the perception position of each third obstacle and the labeled position of each negative sample; and
 an establishment unit, configured to establish a preliminary matching relationship between the third obstacle and the negative sample which overlap in positions;

where the establishment unit is further configured to determine a target matching relationship, according to the preliminary matching relationship and the third obstacle.

In a possible implementation, the determining module 1503 includes:
 the determining unit, further configured to determine the third obstacle having the preliminary matching relationship with the negative sample as a fourth obstacle; and
 an updating unit, configured to remove the preliminary matching relationship corresponding to the fourth obstacle if the fourth obstacle meets a preset condition to obtain the target matching relationship after updating, where the preset condition is used to indicate that the fourth obstacle is a physical obstacle.

In a possible implementation, the determining module 1503 includes:
 the determining unit, further configured to determine the negative sample having the target matching relationship with the fourth obstacle as the target obstacle.

In a possible implementation, the preset condition includes at least one of the following items: a perception category of the fourth obstacle being a category of a physical obstacle, the number of image frames corresponding to the fourth obstacle being greater than a preset number, a difference between a length of the fourth obstacle in a current image frame and an average length of fourth obstacles in the image frames being less than or equal to a first threshold, a difference between a width of the fourth obstacle in a current image frame and an average width of the fourth obstacles in the image frames being less than or equal to a second threshold, or a difference between a height of the fourth obstacle in a current image frame and an average height of the fourth obstacles in the image frames being less than or equal to a third threshold.

In a possible implementation, the determining module 1503 includes:
 the determining unit, further configured to determine a ratio of the number of the target obstacle to the number of the negative sample as a detection result of the perception data, where the detection result is a recall rate of the negative sample.

The present disclosure provides a perception data detection method and apparatus, applied to the field of autonomous driving and vehicle-road collaboration in the field of intelligent transportation, so as to achieve the purpose of effectively ensuring the comprehensiveness of detection.

According to embodiments of the present disclosure, the present disclosure further provides an electronic device and a readable storage medium.

According to an embodiments of the present disclosure, the present disclosure further provides a computer program product, where the program product includes a computer program, the computer program is stored in a readable storage medium, at least one processor of the electronic device can read the computer program from the readable storage medium, and the at least one processor executes the computer program to cause the electronic device to perform the solution provided by any of the above embodiments.

Figure 16:
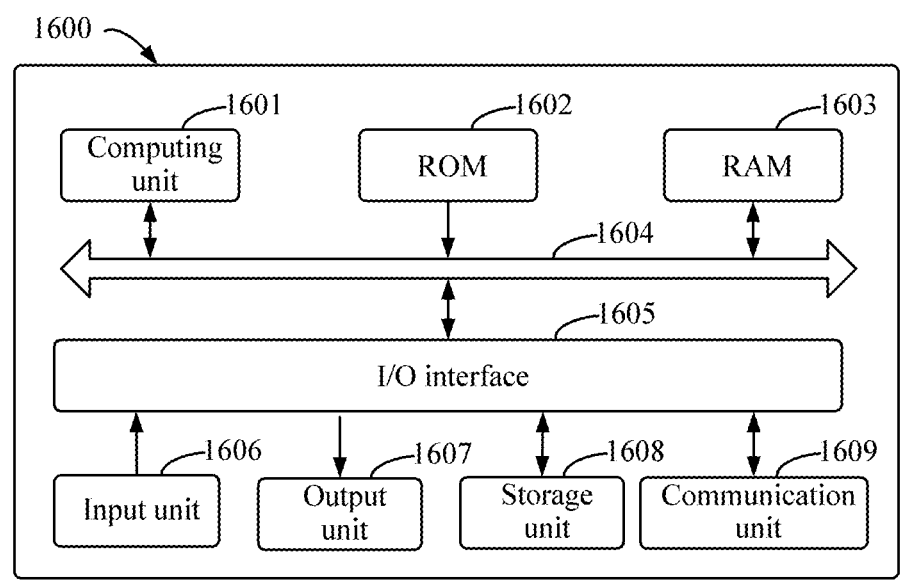
FIG. 16 is a block diagram of an electronic device used to implement a perception data detection method according to an embodiment of the present disclosure.

FIG. 16 shows a schematic block diagram of an exemplary electronic device 1600 that can be used to implement the embodiments of the present disclosure. The electronic device is intended to represent various forms of digital computer, such as a laptop computer, a desktop computer, a workstation, a personal digital assistant, a server, a blade server, a mainframe computer, or other suitable computer.

The electronic device may also represent various forms of mobile apparatus, such as a personal digital assistant, a cellular phone, a smart phone, a wearable device or other similar computing apparatus. The components, their connection and relationship, and their functions shown herein are merely examples, and are not intended to limit the implementation of the present disclosure described and/or required herein.

As shown in FIG. 16, the electronic device 1600 includes: a computing unit 1601, which can perform various appropriate actions and processing according to the computer program stored in the read only memory (ROM) 1602 or the computer program loaded from the storage unit 1608 to the random access memory (RAM) 1603. Various programs and data required for the operation of the device 1600 can also be stored in RAM 1603. The computing unit 1601, ROM 1602, and RAM 1603 are connected to each other through the bus 1604. The input/output (I/O) interface 1605 is also connected to the bus 1604.

A plurality of components in the device 1600 are connected to the I/O interface 1605, including: an input unit 1606, such as a keyboard, a mouse, etc.; an output unit 1607, e.g., various types of display, speaker, etc.; the storage unit 1608, such as a magnetic disk, an optical disk, etc.; and a communication unit 1609, such as a network card, a modem, a wireless communication transceiver, etc. The communication unit 1609 allows the device 1600 to exchange information/data with other devices through a computer network such as the Internet and/or various telecommunication networks.

The computing unit 1601 may be various general-purpose and/or special-purpose processing components with processing and computing capabilities. Some examples of the computing unit 1601 include, but are not limited to, a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, etc. The computing unit 1601 performs the various methods and processes described above, such as the perception data detection method. For example, in some embodiments, the perception data detection method may be implemented as a computer software program, which is tangibly contained in a machine-readable medium, such as the storage unit 1608. In some embodiments, part or all of the computer program may be loaded and/or installed on the device 1600 via the ROM 1602 and/or the communication unit 1609. When the computer program is loaded to the RAM 1603 and executed by the computing unit 1601, one or more steps of the perception data detection method described above can be implemented. Alternatively, in other embodiments, the computing unit 1601 may be configured to perform the perception data detection method in any other suitable manner (e.g., by means of firmware).

Herein, various implementations of the system and technology described above may be implemented in a digital electronic circuit system, an integrated circuit system, a field programmable gate array (FPGA), an application specific integrated circuit (ASIC), an application specific standard product (ASSP), a system on a chip system (SOC), a complex programming logic device (CPLD), computer hardware, firmware, software, and/or a combination thereof. These various implementations may include: being implemented in one or more computer programs, the one or more computer programs can be executed and/or interpreted on a programmable system including at least one programmable processor, the programmable processor may be a dedicated or general programmable processor, which can receive data and instructions from a storage system, at least one input device, and at least one output device, and transmit data and instructions to the storage system, the at least one input device, and the at least one output device.

The program codes used to implement the method of the present disclosure may be written in any combination of one or more programming languages. These program codes can be provided to the processor or controller of a general-purpose computer, a special-purpose computer, or other programmable data processing device, so that when the program codes are executed by the processor or controller, the function/operation specified in the flowchart and/or block diagram is implemented. The program codes may be executed entirely on a machine, partly executed on the machine, partly executed on a machine and partly executed on a remote machine as an independent software package, or entirely executed on the remote machine or server.

In the context of the present disclosure, the machine readable medium may be a tangible medium that may contain or store a program for use by or in combination with an instruction execution system, an apparatus, or a device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the above. A more specific example of the machine readable storage medium would include an electrical connection based on one or more wires, a portable computer disk, a hard disk, a random access memory (RAM), a read only memory (ROM), an erasable programmable read-only memory (EPROM or flash memory), an optical fiber, a portable compact disk read only memory (CD-ROM), an optical storage device, a magnetic storage device, or any suitable combination of the above.

In order to provide interaction with a user, the system and technology described herein may be implemented in a computer, where the computer has: a display apparatus for displaying information to a user (e.g., a CRT (cathode ray tube) or LCD (liquid crystal display) monitor); and a keyboard and a guiding apparatus (e.g., a mouse or a trackball). The user can provide the computer with input through the keyboard and the guiding apparatus. Other types of apparatus may be further used to provide interaction with the user; for example, the feedback provided to the user may be any form of sensory feedback (e.g., visual feedback, auditory feedback, or tactile feedback); and the input from the user may be received in any form (including sound input, voice input, or tactile input).

The system and technology described herein may be implemented in a computing system including a back-end component (e.g., as a data server), or a computing system including a middleware component (e.g., an application server), or a computing system including a front-end component (e.g., a user computer with a graphical user interface or a web browser, where the user can interact with the implementations of the system and technology described herein through the graphical user interface or the web browser), or a computing system including any combination of such back-end component, middleware component and front-end component. The components of the system may be connected with each other through digital data communication (e.g., a communication network) in any form or medium. The example of the communication network includes local area network (LAN), wide area network (WAN) and the Internet.

The computer system may include a client and a server. The client and the server are generally far away from each other and generally interact through the communication network. The relationship of the client and the server is generated by the computer programs running on a corresponding computer and having a client-server relationship. The server may be a cloud server, also known as a cloud computing server or a cloud host, which is a host product in a cloud computing service system to solve the shortcomings of high management difficulty and weak business scalability existing in a traditional physical host and VPS service ("Virtual Private Server", abbreviated as "VPS"). The server may also be a server of a distributed system, or a server combined with a blockchain.

It should be understood that various forms of process shown above may be used, and reordering, addition, or deletion steps may be performed. For example, the steps recorded in the present disclosure may be performed in parallel or sequentially or in different orders, as long as the desired result of the technical solution disclosed in the present disclosure can be achieved, this is not limited herein.

The above specific implementations do not constitute a limitation on the protection scope of the present disclosure. Those skilled in the art should understand that various modifications, combinations, sub-combinations and substitutions can be made based on the design requirements and other factors. Any modification, equivalent substitution, or improvement made within the spirit and principle of the present disclosure shall be included in the protection scope of the present disclosure.

What is claimed is:

1. A perception data detection method, comprising:
   acquiring labeled data and perception data, wherein the labeled data comprises a labeled position and a labeled type of at least one first obstacle, and the perception data comprises a perception position and a perception type of at least one second obstacle;
   performing, according to a negative sample in the labeled data, rough filtering on the second obstacle in the perception data to obtain a third obstacle remaining after the rough filtering, wherein the negative sample is a non-physical obstacle;
   determining a matching relationship between the third obstacle and the negative sample, and determining the negative sample having the matching relationship with the third obstacle as a target obstacle; and
   determining a detection result of the perception data, according to a number of the target obstacle and a number of the first obstacle;
   wherein performing, according to the negative sample in the labeled data, the rough filtering on the second obstacle in the perception data to obtain the third obstacle remaining after the rough filtering comprises:
   calculating, according to the labeled position of each negative sample and the perception position of each second obstacle, a distance between each negative sample and each second obstacle; and
   retaining the second obstacle whose distance from the negative sample is less than or equal to a preset distance to obtain the third obstacle remaining after the rough filtering.

2. The method according to claim 1, wherein determining the matching relationship between the third obstacle and the negative sample comprises:
   determining, according to the perception position of each third obstacle and the labeled position of each negative sample, the third obstacle and the negative sample which overlap in positions;
   establishing a preliminary matching relationship between the third obstacle and the negative sample which overlap in positions; and
   determining, according to the preliminary matching relationship and the third obstacle, a target matching relationship.

3. The method according to claim 2, wherein determining, according to the preliminary matching relationship and the third obstacle, the target matching relationship comprises:
   determining the third obstacle having the preliminary matching relationship with the negative sample as a fourth obstacle; and
   removing the preliminary matching relationship corresponding to the fourth obstacle if the fourth obstacle meets a preset condition to obtain the target matching relationship after updating, wherein the preset condition is used to indicate that the fourth obstacle is a physical obstacle.

4. The method according to claim 3, wherein determining the negative sample having the matching relationship with the third obstacle as the target obstacle comprises:
   determining the negative sample having the target matching relationship with the fourth obstacle as the target obstacle.

5. The method according to claim 3, wherein the preset condition comprises at least one of the following items: a perception category of the fourth obstacle being a category of a physical obstacle, a number of image frames corresponding to the fourth obstacle being greater than a preset number, a difference between a length of the fourth obstacle in a current image frame and an average length of fourth obstacles in the image frames being less than or equal to a first threshold, a difference between a width of the fourth obstacle in a current image frame and an average width of the fourth obstacles in the image frames being less than or equal to a second threshold, or a difference between a height of the fourth obstacle in a current image frame and an average height of the fourth obstacles in the image frames being less than or equal to a third threshold.

6. The method according to claim 1, wherein determining, according to the number of the target obstacle and the number of the first obstacle, the detection result of the perception data comprises:
   determining a ratio of the number of the target obstacle to the number of the negative sample as a detection result of the perception data, wherein the detection result is a recall rate of the negative sample.

7. A perception data detection device, comprising:
   at least one processor; and
   a memory communicatively connected with the at least one processor; wherein,
   the memory stores instructions executable by the at least one processor, and the instructions are executed by the at least one processor to cause the at least one processor to:
   acquire labeled data and perception data, wherein the labeled data comprises a labeled position and a labeled type of at least one first obstacle, and the perception data comprises a perception position and a perception type of at least one second obstacle;

perform, according to a negative sample in the labeled data, rough filtering on the second obstacle in the perception data to obtain a third obstacle remaining after the rough filtering, wherein the negative sample is a non-physical obstacle;

determine a matching relationship between the third obstacle and the negative sample, and determine the negative sample having the matching relationship with the third obstacle as a target obstacle; and determine, according to a number of the target obstacle and a number of the first obstacle, a detection result of the perception data;

wherein the instructions are executed by the at least one processor to cause the at least one processor to:

calculate, according to the labeled position of each negative sample and the perception position of each second obstacle, a distance between each negative sample and each second obstacle; and retain the second obstacle whose distance from the negative sample is less than or equal to a preset distance to obtain the third obstacle remaining after the rough filtering.

8. The device according to claim 7, wherein the instructions are executed by the at least one processor to cause the at least one processor to:

determine, according to the perception position of each third obstacle and the labeled position of each negative sample, the third obstacle and the negative sample which overlap in positions;

establish a preliminary matching relationship between the third obstacle and the negative sample which overlap in positions; and determine, according to the preliminary matching relationship and the third obstacle, a target matching relationship.

9. The device according to claim 8, wherein the instructions are executed by the at least one processor to cause the at least one processor to:

determine the third obstacle having the preliminary matching relationship with the negative sample as a fourth obstacle; and remove the preliminary matching relationship corresponding to the fourth obstacle if the fourth obstacle meets a preset condition to obtain the target matching relationship after updating, wherein the preset condition is used to indicate that the fourth obstacle is a physical obstacle.

10. The device according to claim 9, wherein the instructions are executed by the at least one processor to cause the at least one processor to:

determine the negative sample having the target matching relationship with the fourth obstacle as the target obstacle.

11. The device according to claim 9, wherein the preset condition comprises at least one of the following items: a perception category of the fourth obstacle being a category of a physical obstacle, the number of image frames corresponding to the fourth obstacle being greater than a preset number, a difference between a length of the fourth obstacle in a current image frame and an average length of fourth obstacles in the image frames being less than or equal to a first threshold, a difference between a width of the fourth obstacle in a current image frame and an average width of the fourth obstacles in the image frames being less than or equal to a second threshold, or a difference between a height of the fourth obstacle in a current image frame and an average height of the fourth obstacles in the image frames being less than or equal to a third threshold.

12. The device according to claim 7, wherein the instructions are executed by the at least one processor to cause the at least one processor to:

determine a ratio of the number of the target obstacle to the number of the negative sample as a detection result of the perception data, wherein the detection result is a recall rate of the negative sample.

13. A non-transitory computer readable storage medium storing computer instructions, wherein the computer instructions are used to cause a computer to:

acquire labeled data and perception data, wherein the labeled data comprises a labeled position and a labeled type of at least one first obstacle, and the perception data comprises a perception position and a perception type of at least one second obstacle;

perform, according to a negative sample in the labeled data, rough filtering on the second obstacle in the perception data to obtain a third obstacle remaining after the rough filtering, wherein the negative sample is a non-physical obstacle;

determine a matching relationship between the third obstacle and the negative sample, and determining the negative sample having the matching relationship with the third obstacle as a target obstacle; and determine a detection result of the perception data, according to a number of the target obstacle and a number of the first obstacle;

wherein the computer instructions are used to cause the computer to:

calculate, according to the labeled position of each negative sample and the perception position of each second obstacle, a distance between each negative sample and each second obstacle; and retain the second obstacle whose distance from the negative sample is less than or equal to a preset distance to obtain the third obstacle remaining after the rough filtering.

* * * * *